Sept. 4, 1923.
D. G. McCAA
CURRENT RELAYING AND PRODUCTION
Filed May 18, 1921
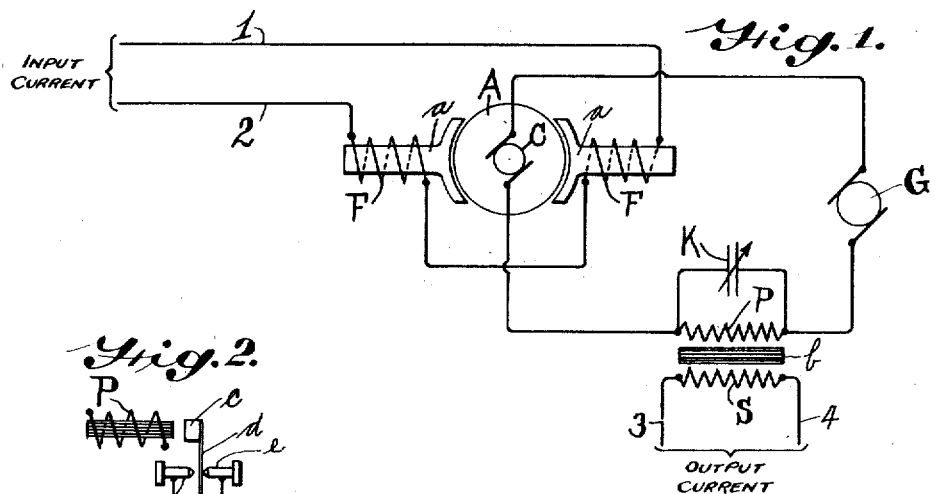

Patented Sept. 4, 1923.

1,466,912

UNITED STATES PATENT OFFICE.

DAVID G. McCAA, OF PALO ALTO, CALIFORNIA, ASSIGNOR OF ONE-HALF TO CORNELIUS D. EHRET, OF PHILADELPHIA, PENNSYLVANIA.

CURRENT RELAYING AND PRODUCTION.

Application filed May 18, 1921. Serial No. 470,536.

*To all whom it may concern:*

Be it known that I, DAVID G. McCAA, a citizen of the United States, residing in the city of Palo Alto, county of Santa Clara, State of California, have invented a new and useful Current Relaying and Production, of which the following is a specification.

My invention relates to the relaying and production of current by dynamo-electric action.

My invention resides in the method of and apparatus for relaying electric current by causing one current, generally weak and fluctuating or alternating, to set up in a circuit containing or related to a source capable of delivering relatively powerful current, a controlling electro-motive-force by dynamo-electric action.

My invention resides further in the method of and apparatus for producing fluctuating or alternating current or oscillations of any suitable frequency by coupling, preferably inductively, a circuit containing a source of current, as direct current, and an armature of a dynamo-electric machine with a circuit, which may be the output circuit or coupled to an output circuit, containing the field winding of the dynamo-electric machine and in addition, preferably, a condenser.

My invention resides in the method and apparatus hereinafter described and claimed.

For an illustration of some of the forms my apparatus may take, and for an understanding of my method, reference is to be had to the accompanying drawing, in which:

Fig. 1 is a diagrammatic view of relay circuits.

Fig. 2 is a fragmentary view illustrating a modification.

Fig. 3 is a diagrammatic view of circuits for producing fluctuating or alternating current or oscillations.

Fig. 4 comprises front and side views of a disk armature.

Fig. 5 represents a mode of use of the disk armature.

Referring to Fig. 1, the conductors 1 and 2 are those of an input circuit delivering current as a fluctuating or alternating current, including telegraphic, telephonic or other signaling current, to the field windings F, F of a dynamo electric machine having an armature A, of the direct current type, having a commutator C. As indicated, the field may be provided with pole members $a$, $a$, of iron when the frequency of the input current is sufficiently low, the iron structure being preferably suitably finely laminated or subdivided. In circuit with the armature A is a direct current generator G or any other suitable source of direct current, as a battery, etc.; and the primary P of a transformer whose secondary S connects to the output circuit by conductors 3 and 4, the output circuit containing a telephone receiver or any other suitable translating instrument which is to be affected by a current greater than that delivered by the input circuit. The primary P may be shunted by a condenser K of capacity suited to circumstances for shunting around the primary P the parasitic current variations due to the commutator C.

The transformer may have a laminated iron core $b$ when the frequencies dealt with are not too high.

The armature A is rotated by any suitable means, as, for example, an electric motor, not shown.

With no current in the input circuit, there will flow through the circuit of the armature A and primary P a steady or unmodulated direct current. If, however, a fluctuating or alternating current is delivered by the input circuit, the magnetic field in which the armature A rotates will fluctuate or alternate in correspondence with the input current, with the result that the armature A will generate electro-motive-forces coinciding with or opposing the electro-motive-force of the source G and so cause modulation of the direct current into fluctuating current, the fluctuating component being transformed by the transformer P, S, and causing delivery of relatively powerful fluctuating or alternating current to the output circuit.

Notwithstanding great power of the source G and weakness of the input current, the heavy current delivered by the source G is nevertheless controlled by the electro-motive-forces set up in the armature A by its rotation in the field produced by the weak input current.

The effect described, which may be considered a trigger effect, is the greater the higher the speed of rotation of the armature A. For example, a telephonic current or a current representing a radio signal or message, may be delivered to the apparatus by the conductors 1 and 2, and in the output circuit will appear a like telephonic or other current greatly magnified.

In lieu of employing the current in an output circuit, the controlled current from the source G may be employed to operate the ordinary relay contacts controlling a circuit including a further source of energy and translating device. This is indicated in Fig. 2, where the winding P is employed as that of an electro-magnet having an armature $c$ carried by a leaf spring $d$ normally resting against a stop or contact $e$. An adjustment may be made such that normally the armature $c$ will not be attracted, but will be attracted upon presence of current in the input circuit 1 and 2, the resultant attraction of the armature $c$ carrying the spring $d$ away from the stop or contact $e$ and so breaking a circuit comprising the conductors $g$ and $h$ connected, respectively, to the spring $d$ and contact $e$. By employing a contact $i$ a relay circuit, comprising the conductors $g$ and $j$, may be closed upon attraction of the armature $c$.

Referring to Fig. 3, there is illustrated apparatus similar to that above described for producing from uni-directional or direct current alternating current or oscillations. As before, the circuit of the armature A includes the source G and the transformer primary P. The transformer secondary S, however, is connected in circuit with the field winding F, F and the condenser $K^1$ to form an output circuit which may be connected directly to the conductors 5 and 6, or which may be inductively coupled, as illustrated, by transformer $P^1$, $S^1$ to the output circuit 7, 8.

When a current from the source G increasing or rising in the primary P sets up in the circuit of the secondary S and field winding F, F an electro-motive-force or current of a certain direction, with suitable arrangements and connection of the windings the secondary electro-motive-force or current acting in the windings F, F causes production in the armature A of an electro-motive-force opposing the electro-motive-force of the source G and causes current in the primary P to fall. When the current in the primary P so falls, there will be set up in the secondary circuit a current in reverse sense to that previously existing, with the result that the windings F, F will now set up a magnetic field that causes the armature A to produce electro-motive-force assisting the electro-motive-force of the source G, thereby causing a rise in current in the primary P. And so on; this action is cyclically repeated, with the result that in the secondary circuit there is a periodically rising and falling current, which may be directly delivered to an output circuit, or which in passing through the primary $P^1$ induces an alternating current or oscillations in the secondary $S^1$ which delivers to the output circuit 7, 8.

The frequency of the current or oscillations so produced may be controlled by suitably adjusting the relative magnitudes of the capacity of the condenser $K^1$ and of the inductance in circuit.

With respect to both Figs. 1 and 3, the armature A, particularly when high frequencies are involved, may take the form of a disk, as indicated in Figs. 4 and 5, the armature structure being without iron when the frequencies involved are high.

As indicated in Fig. 5, the disk armature A may be associated with a plurality of sets of field windings F, the field also being without iron when high frequencies are involved.

What I claim is:

1. The method of producing fluctuation in amplitude of an electric current dynamo-electric action effected by relative movement of an armature winding and a magnetic field, which comprises passing the current through the armature, and producing fluctuation in the strength of the magnetic field, whereby the fluctuating electro-motive-force generated by the armature effects fluctuation of said current passing through said armature.

2. The method of producing fluctuating or alternating current or oscillations by dynamo-electric action effected by relative movement of an armature winding and a magnetic field, which comprises passing direct current through the armature winding, and varying the strength of the magnetic field by a current inductively derived from fluctuation of magnitude of said current.

3. The method of producing fluctuating or alternating current or oscillations by dynamo-electric action effected by relative movement of an armature winding and a magnetic field produced by current traversing a field winding, which comprises passing a direct current through said armature winding, and inductively coupling the circuits of said armature and field windings, whereby said circuits react upon each other to cause fluctuation of the current passed through said armature winding and of the current induced in said field winding.

4. Apparatus for producing alternating current comprising a source of direct current, a direct current armature in circuit therewith, a field winding with respect to which said armature is rotated, and a coupling between the circuits of said armature and said field winding.

5. Apparatus for producing alternating current comprising a source of direct current, a direct current armature in circuit therewith, a field winding with respect to which said armature is rotated, a winding in circuit with said armature, a winding in circuit with said field winding inductively coupled to said last named winding, and a condenser in the circuit of said field winding.

6. Apparatus for producing alternating current comprising a source of direct current, a direct current armature in circuit therewith, a field winding with respect to which said armature is rotated, a winding in circuit with said armature, a winding in circuit with said field winding inductively coupled to said last named winding, a condenser in the circuit of said field winding, a transformer primary in the circuit of said field winding, and an output circuit connected to the transformer secondary.

7. Apparatus for producing fluctuation in amplitude of an electric current comprising relatively moving armature and field windings, a source of current in circuit with said armature, and means for causing fluctuation in the field current for producing in said armature an electro-motive-force similarly fluctuating and similarly varying the magnitude of the current passed through said armature.

8. Apparatus for producing fluctuation in amplitude of an electric current comprising relatively moving armature and field windings, a source of direct current in circuit with said armature, and means for causing fluctuation in the field current for producing in said armature an electro-motive-force similarly fluctuating and similarly varying the magnitude of the current passed through said armature.

9. Apparatus for producing fluctuating or alternating current or oscillations comprising relatively movable armature and field windings, means for passing a current through said armature winding, and means for effecting reaction between the armature and field windings, whereby fluctuations of field effect fluctuations of current through said armature and in turn said fluctuations of armature current effect fluctuations of said field.

10. Apparatus for producing fluctuating or alternating current or oscillations comprising relatively movable armature and field windings, means for passing a direct current through said armature winding, and means for effecting reaction between the armature and field windings, whereby fluctuations of field effect fluctuations of current through said armature and in turn said fluctuations of armature current effect fluctuations of said field.

In testimony whereof I have hereunto affixed my signature this 11th day of May, 1921.

DAVID G. McCAA.